US012325146B1

(12) United States Patent
Liu

(10) Patent No.: US 12,325,146 B1
(45) Date of Patent: Jun. 10, 2025

(54) HAND-PUSHED PAPER CUTTING APPARATUS

(71) Applicant: Shenzhen Huafengqiwu Technology Co., Ltd, Guangdong (CN)

(72) Inventor: Danfeng Liu, Anhui (CN)

( * ) Notice: Subject to any disclaimer, the term of this patent is extended or adjusted under 35 U.S.C. 154(b) by 0 days.

(21) Appl. No.: 18/983,989

(22) Filed: Dec. 17, 2024

(51) Int. Cl.
*B26B 27/00* (2006.01)
*B26B 29/02* (2006.01)
*B26B 29/06* (2006.01)

(52) U.S. Cl.
CPC .............. *B26B 27/00* (2013.01); *B26B 29/06* (2013.01)

(58) Field of Classification Search
None
See application file for complete search history.

(56) References Cited

U.S. PATENT DOCUMENTS 5,638,603 A * 6/1997 Li .......................... B26B 27/00 30/294
8,495,818 B1 * 7/2013 Peppett .................. B26B 5/005 30/282
12,090,678 B1 * 9/2024 Liu ........................ B26D 1/015
2006/0236550 A1 * 10/2006 Gullicks .................. B26B 3/08 30/294
2016/0008991 A1 * 1/2016 Peppett .................. B26B 29/02 30/280

* cited by examiner

*Primary Examiner* — Hwei-Siu C Payer
(74) *Attorney, Agent, or Firm* — Hawaii Patent Services; Nathaniel K. Fedde; Kenton N. Fedde

(57) ABSTRACT

A hand-pushed paper cutting apparatus comprises a main body and a blade assembly installed on the main body. The main body has at least one end face oriented toward paper, and the end face is configured as a cutting face. The cutting face is provided with a receiving groove for installing the blade assembly. The blade assembly comprises a blade holder and a blade, and a gap exists between the blade holder and an inner wall of the receiving groove and is designated as a cutting area.

18 Claims, 8 Drawing Sheets

HAND-PUSHED PAPER CUTTING APPARATUS

BACKGROUND OF THE INVENTION

1. Technical Field

The invention relates to the technical field of manual paper cutters, in particular to a hand-pushed paper cutting apparatus.

2. Description of Related Art

A paper cutter, also known as a guillotine, is a tool specifically designed for cutting paper. Its main function is to precisely cut paper to the desired size and shape using a sharp blade. Manual paper cutters require the user to manually push the blade to make cuts, and are suitable for small sheets of paper and limited cutting needs.

The existing U.S. Pat. No. 11,717,977 discloses a "Paper Cutter". This manual paper cutter features a cylindrical structure, making it large and inconvenient to carry. Additionally, the paper cutter lacks a movement guiding mechanism, which can lead to misalignment during cutting, adversely affecting the cutting quality and results.

Therefore, it is necessary to propose a novel paper cutter which is smaller in size, with a simple and compact structure, and offers improved cutting performance.

BRIEF SUMMARY OF THE INVENTION

The invention provides a hand-pushed paper cutting apparatus to address the issues raised in the background art.

To achieve the above object, the invention provides a hand-pushed paper cutting apparatus, comprising a main body and a blade assembly installed on the main body; the main body has at least one end face oriented toward paper, the end face is configured as a cutting face, the cutting face is provided with a receiving groove for installing the blade assembly; the blade assembly comprises a blade holder and a blade, and a gap exists between the blade holder and an inner wall of the receiving groove is designated as a cutting area; the cutting area features a feeding end and a cutting end, and a paper movement direction is formed between the feeding end and the cutting end; the cutting face is provided with paper pressing sections for tensioning the paper, and the paper pressing sections are located on two sides of the paper movement direction; the blade holder has at least one supporting face facing the cutting area, and the supporting face, in conjunction with the paper pressing sections, tensions the paper; the cutting area is further provided with a guiding section extending toward the supporting face to direct the paper toward the blade; and the cutting face is also provided with a walking mechanism designed to maintain linear movement of the main body and located on two sides of the paper movement direction.

The invention further provides a hand-pushed paper cutting apparatus, comprising a main body and a blade assembly installed on the main body; the main body has at least one end oriented toward paper, the end is configured as a cutting terminal, and the blade assembly is arranged on the cutting terminal; the blade assembly comprises a blade holder and a blade, and a gap exists between the blade holder and the cutting terminal and is designated as a cutting area; the cutting area features a feeding end and a cutting end, and a paper movement direction is formed between the feeding end and the cutting end; the cutting terminal is provided with paper pressing sections for tensioning the paper, and the paper pressing sections are located on two sides of the paper movement direction; the blade holder has at least one supporting face facing the cutting area, and the supporting face, in conjunction with the paper pressing sections, tensions the paper; the cutting area is further provided with a guiding section extending toward the supporting face to direct the paper toward the blade; and the cutting terminal is also provided with a walking mechanism designed to maintain linear movement of the main body and located on two sides of the paper movement direction.

BRIEF DESCRIPTION OF THE SEVERAL VIEWS OF THE DRAWINGS

The drawings that form a part of this application are used to provide a further understanding of the invention. The illustrative embodiments of the invention and their description are used to explain the invention, and do not constitute an improper limitation of the invention. In the drawings.

Figure 1:
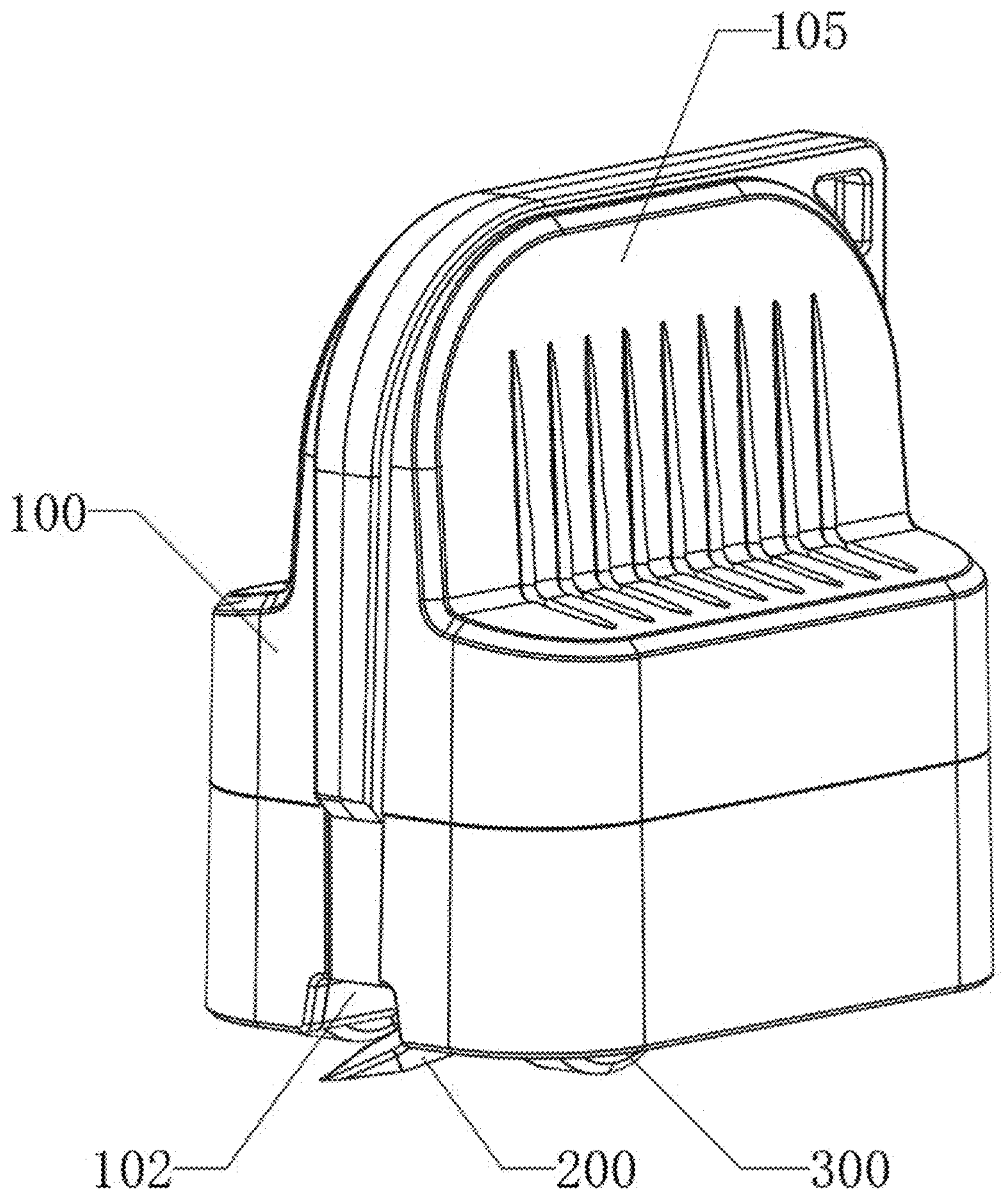
FIG. 1 is a diagram of an overall structure of the invention.

DESCRIPTION OF REFERENCE NUMERALS main body (100); cutting face (101); receiving groove (102); cutting area (1021); feeding end (1022); cutting end (1023); paper pressing section (103); guiding section (104); grip (105); blade assembly (200); blade holder (201); installation groove (2011); supporting face (2012); connecting end (2013); pointed tip (2014); blade (202); walking mechanism (300).

DETAILED DESCRIPTION OF THE INVENTION

The technical schemes in the embodiments of the present invention are clearly and completely described in the following with reference to the drawings in the embodiments of the present invention. It is obvious that the described embodiments are only some of the embodiments of the present invention and are not all the embodiments thereof. The description of at least one exemplary embodiment below is only illustrative, and in no way should it be taken as any limitation on the invention, its application or uses. Based on the embodiments of the invention, all other embodiments obtained by those of ordinary skill in the art without creative labor are within the scope of the invention.

It should be noted that the terminology used here is only for describing specific implementations, and is not intended to limit exemplary implementations according to the application. As used herein, the singular form is also intended to include the plural form unless the context clearly indicates otherwise. Furthermore, it should be understood that when the terms "comprise" and/or "include" are used in this specification, they specify the presence of features, steps, operations, devices, components and/or combinations thereof.

The relative arrangement, numerical expressions and numerical values of components and steps set forth in these embodiments do not limit the scope of the invention unless otherwise specified. Meanwhile, it should be understood that for convenience of description, the dimensions of various parts shown in the drawings are not drawn according to the actual proportional relationship. Techniques, methods and devices known to those skilled in the relevant fields may not be discussed in detail, but they should be regarded as part of the specification under appropriate circumstances. In all examples shown and discussed herein, any specific values should be interpreted as illustrative only and not as a limitation. Therefore, other examples of exemplary embodiments may have different values. It should be noted that similar reference numerals and letters indicate similar items in the following figures, so once an item is defined in one figure, it will not be further discussed in the following figures.

As shown in FIGS. 1-8, the invention provides a hand-pushed paper cutting apparatus, comprising a main body 100 and a blade assembly 200 installed on the main body 100; the main body 100 has at least one end face oriented toward paper, the end face is configured as a cutting face 101, the cutting face 101 is provided with a receiving groove 102 for installing the blade assembly 200, and a blade holder 201 has a length, a width and a height; and the blade assembly 200 comprises the blade holder 201 and a blade 202 installed on the blade holder 201.

Figure 2:
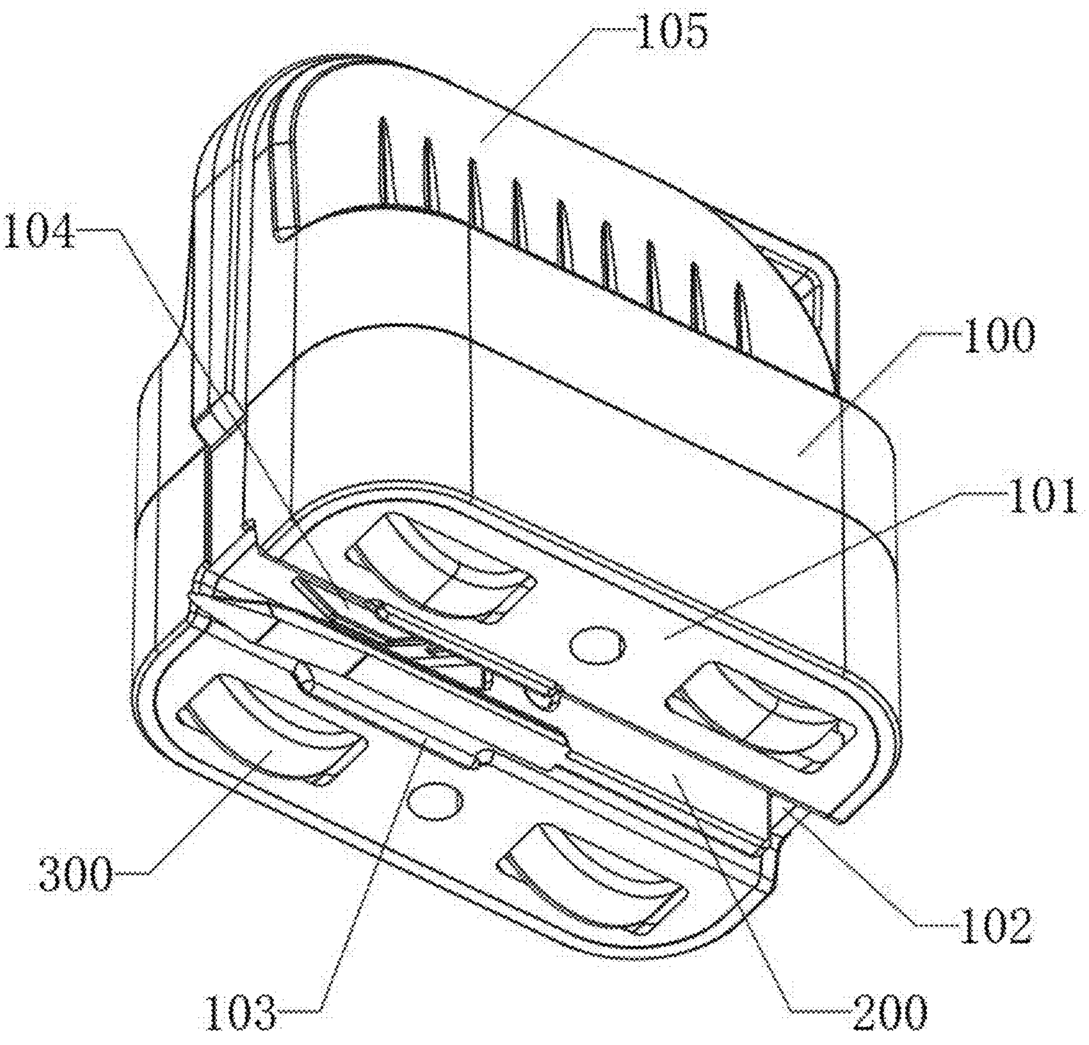
FIG. 2 is a structural diagram of FIG. 1 from another angle.
Figure 6:
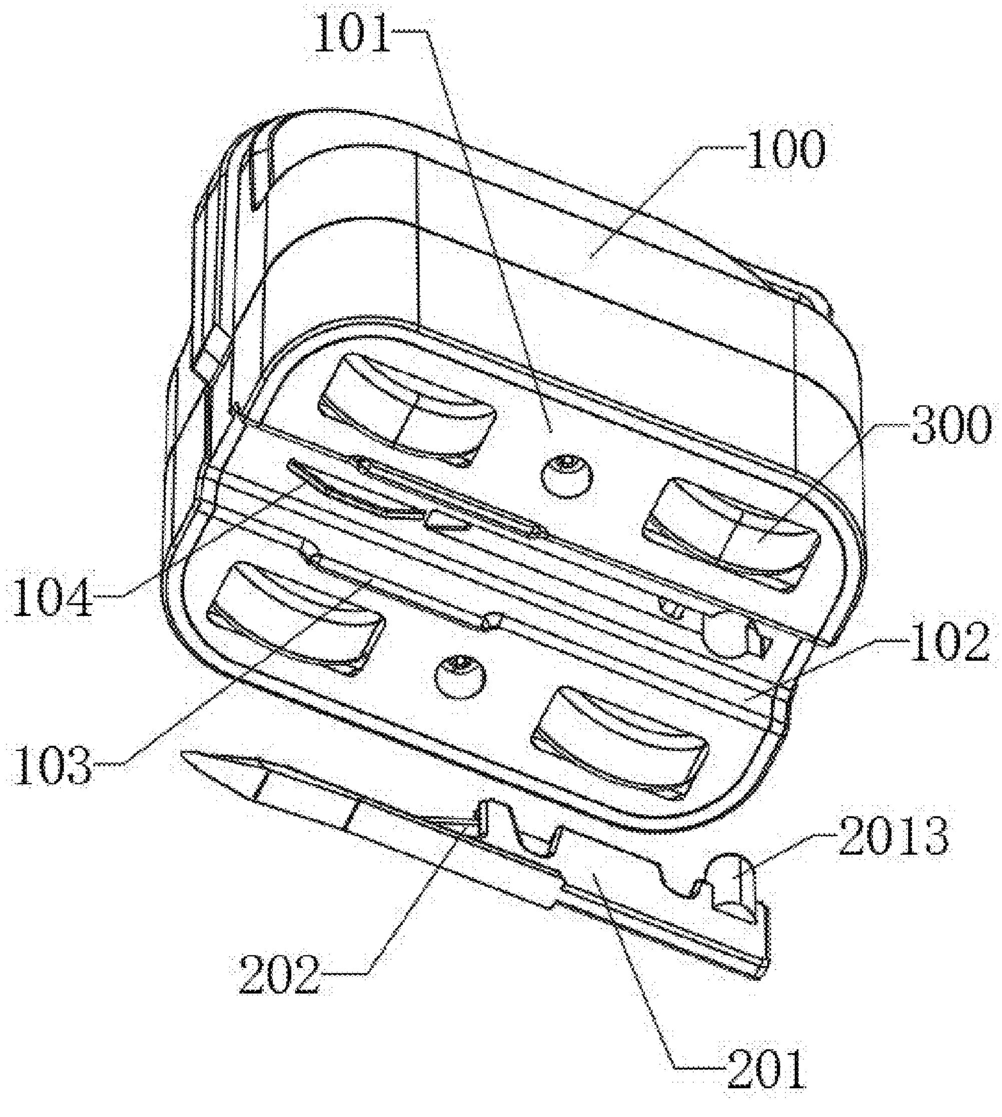
FIG. 6 is a structural diagram after a blade assembly is separated from a main body.

Refer to FIGS. 2 and 6. In this embodiment, the main body 100 is generally shaped like a rectangular or cubic body, which helps to reduce the volume of the paper cutting apparatus, making it easier to carry. It also lowers manufacturing costs. Of course, the shape of the main body 100 is not limited to the aforementioned rectangular or cubic forms. In other embodiments (not shown in the figures), the main body 100 may also take on other geometric shapes, such as fusiform or triangular.

By providing the receiving groove 102 in the cutting face 101, the blade assembly 200 can be accommodated. In this way, the installed blade 202 will be positioned within the receiving groove and blocked, preventing contact with the human body and potential cuts, while also protecting the blade 202 from damage.

Refer to FIG. 2 and FIGS. 5-8. In this embodiment, the blade holder 201 is detachably connected with the receiving groove 102, with a gap maintained between the blade holder 201 and an inner wall of the receiving groove 102. This gap is designated as a cutting area 1021, the cutting area 1021 has a feeding end 1022 and a cutting end 1023, and a paper movement direction is formed between the feeding end 1022 and the cutting end 1023. The blade holder 201 features at least one supporting face 2012 facing the cutting area 1021. The cutting face 101 is provided with paper pressing sections 103 for tensioning the paper, the paper pressing sections 103 are located on two sides of the paper movement direction, and the paper pressing sections 103 are offset from the supporting face 2012 in a height direction of the blade holder 201. The cutting area 1021 also features a guiding section 104 extending toward the supporting face 2012 to guide the paper toward the blade 202. Additionally, the cutting face 101 is provided with a walking mechanism 300 to maintain linear movement of the main body 100, and the walking mechanism 300 is located on two sides of the paper movement direction.

By setting up the cutting area, the paper can pass through the space between the blade holder 201 and the receiving groove 102, allowing the blade 202 to cut the paper as it moves through. During the cutting process, the paper pressing sections 103 and the supporting face work together to tension the paper passing through the cutting area 1021, ensuring smoother cutting and better cutting results.

The guiding section 104 plays a guiding role during the paper cutting process, allowing the paper to move toward the blade 202. Meanwhile, the supporting face 2012 works in conjunction with the guiding section 104 to impose vertical constraints on the paper, reducing the vertical movement of the paper and further enhancing the cutting effect. The main body 100 can move along a plane with paper placed thereon via the walking mechanism 300.

Figure 7:
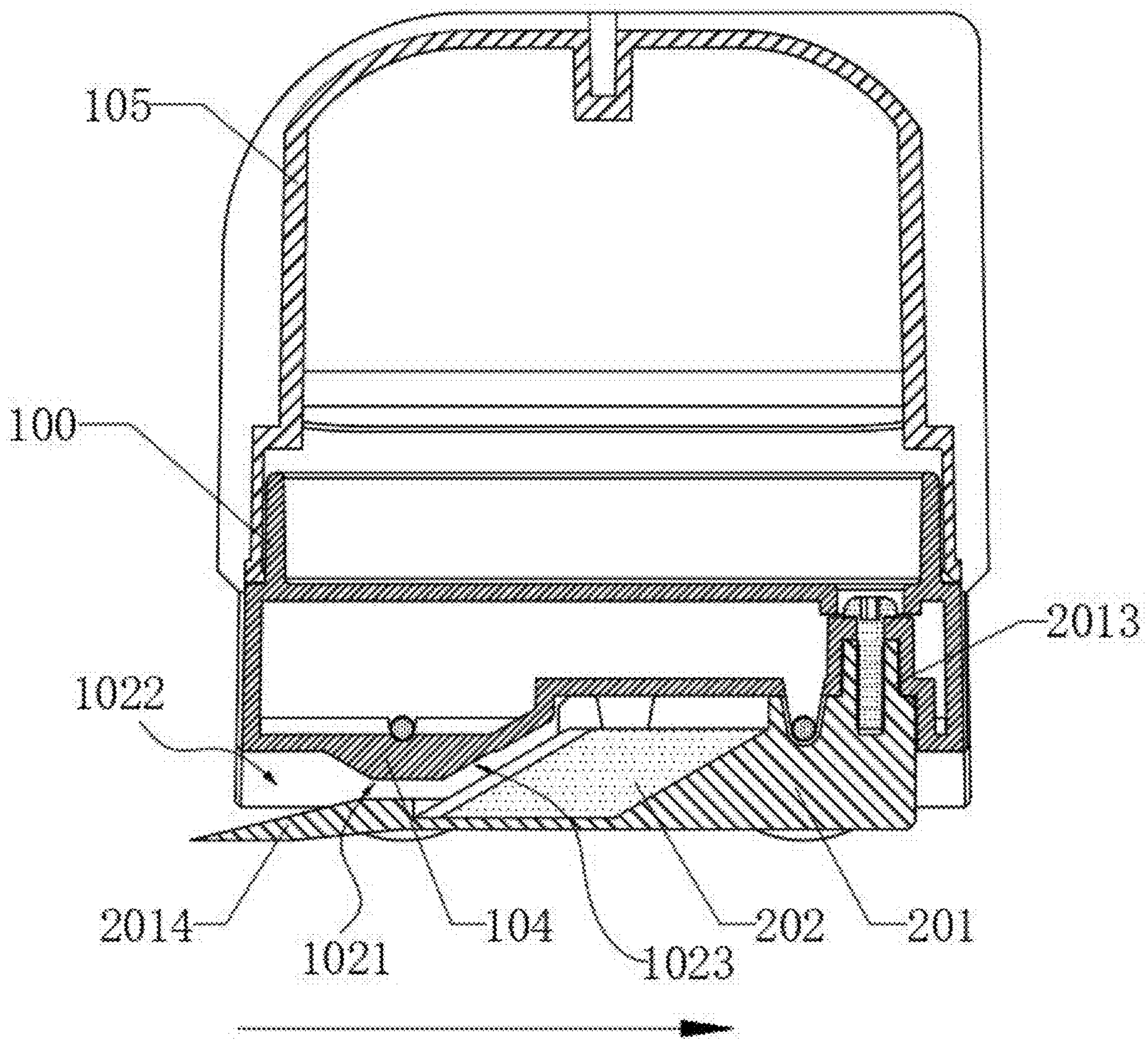
FIG. 7 is a section view of the invention.

According to the above description, in a preferred embodiment of the receiving groove 102 and the cutting area, as shown in FIGS. 2 and 7, the blade holder 201 is arranged parallel to a length direction of the receiving groove 102, and extends out of the receiving groove 102 in a height direction of the receiving groove 102. The cutting area 1021 features a feeding end 1022 and a cutting end 1023, and the blade 202 is installed at the cutting end 1023.

In this embodiment, the paper can enter the cutting area 1021 through the feeding end 1022 and then move to the cutting end 1023, forming the paper movement direction. After reaching the cutting end 1023, the paper will come into contact with the blade 202, and the blade 202 can then cut the paper, as shown in FIG. 7.

According to the above description, in a preferred embodiment of the guiding section 104, the supporting face 2012, and the paper pressing sections 103, as shown in FIG. 2 and FIGS. 5-8, the guiding section 104 is positioned at a bottom of the receiving groove 102, located between the feeding end 1022 and the cutting end 1023. Both the supporting face 2012 and the paper pressing sections 103 are situated between the feeding end 1022 and the cutting end 1023. The supporting face 2012 is located inside the receiving groove 102, while the paper pressing sections 103 on two sides extend away from the cutting face 101.

Figure 8:
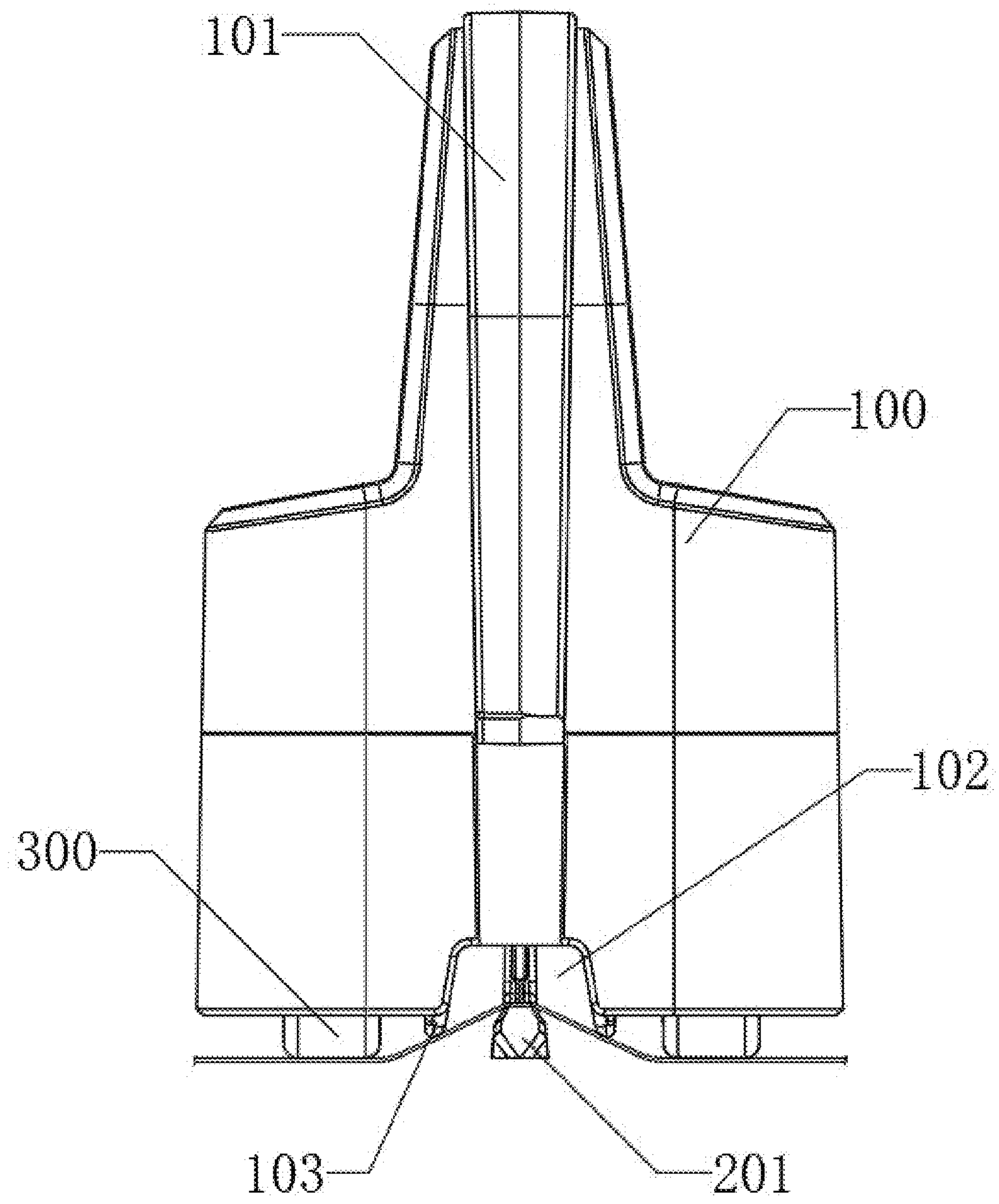
FIG. 8 depicts the status of the invention while cutting paper.

In this embodiment, the paper pressing sections 103 extend downward and are lower than the supporting face 2012, allowing the supporting face 2012 to support a bottom surface of the paper as the paper passes through the cutting area. Meanwhile, the paper pressing sections 103 on two sides can press down on an upper surface of the paper. This causes the paper to arch upward and become tensioned as it passes through, as shown in FIG. 8, and the tensioned paper is then cut by the blade 202. This method enhances the cutting effect and results in smoother cutting. Additionally, in this embodiment, to further improve the tensioning effect on the paper, the paper pressing sections 103 are positioned on two sides of the receiving groove 102 and arranged parallel to the blade holder 201, and extend toward the cutting end 1023, so as to effectively tension the paper.

In this embodiment, the guiding section 104 is arranged parallel to the supporting face 2012 in the vertical direction. During paper cutting, the supporting face 2012 and the guiding section 104 work together to impose vertical constraints on the paper, reducing the vertical movement of the paper and further enhancing the cutting effect.

Further, in this embodiment, two ends of the guiding section 104, facing the feeding end 1022 and the cutting end 1023, are inclined surfaces. The inclusion of the inclined surfaces on the guiding section 104 makes it easier to guide the paper into the space between the guiding section 104 and the supporting face 2012, thereby improving the guiding effect. Of course, the shape of the guiding section 104 is not limited to the aforementioned embodiment; in other embodiments (not shown in the figures), the guiding section 104 may also be in an arc shape or have a long strip shape with rounded corners, and it may also be designed as a rotating guide wheel, among other options.

Figure 3:
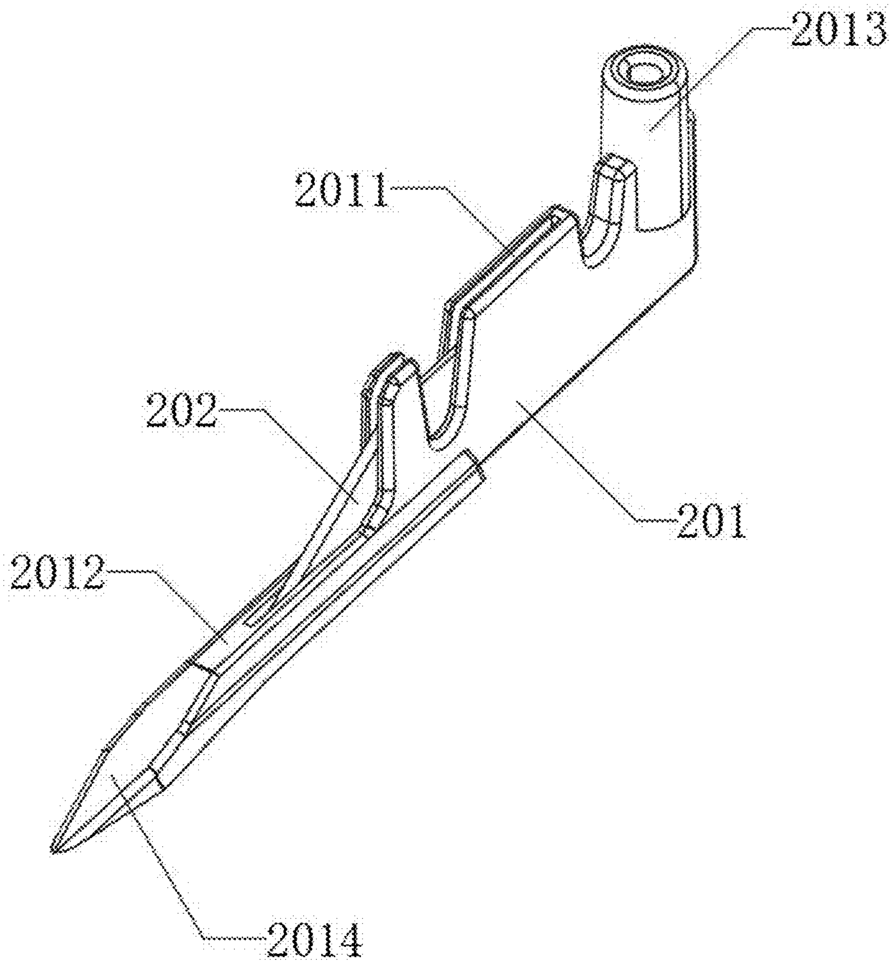
FIG. 3 is a structural diagram of a blade assembly.
Figure 4:
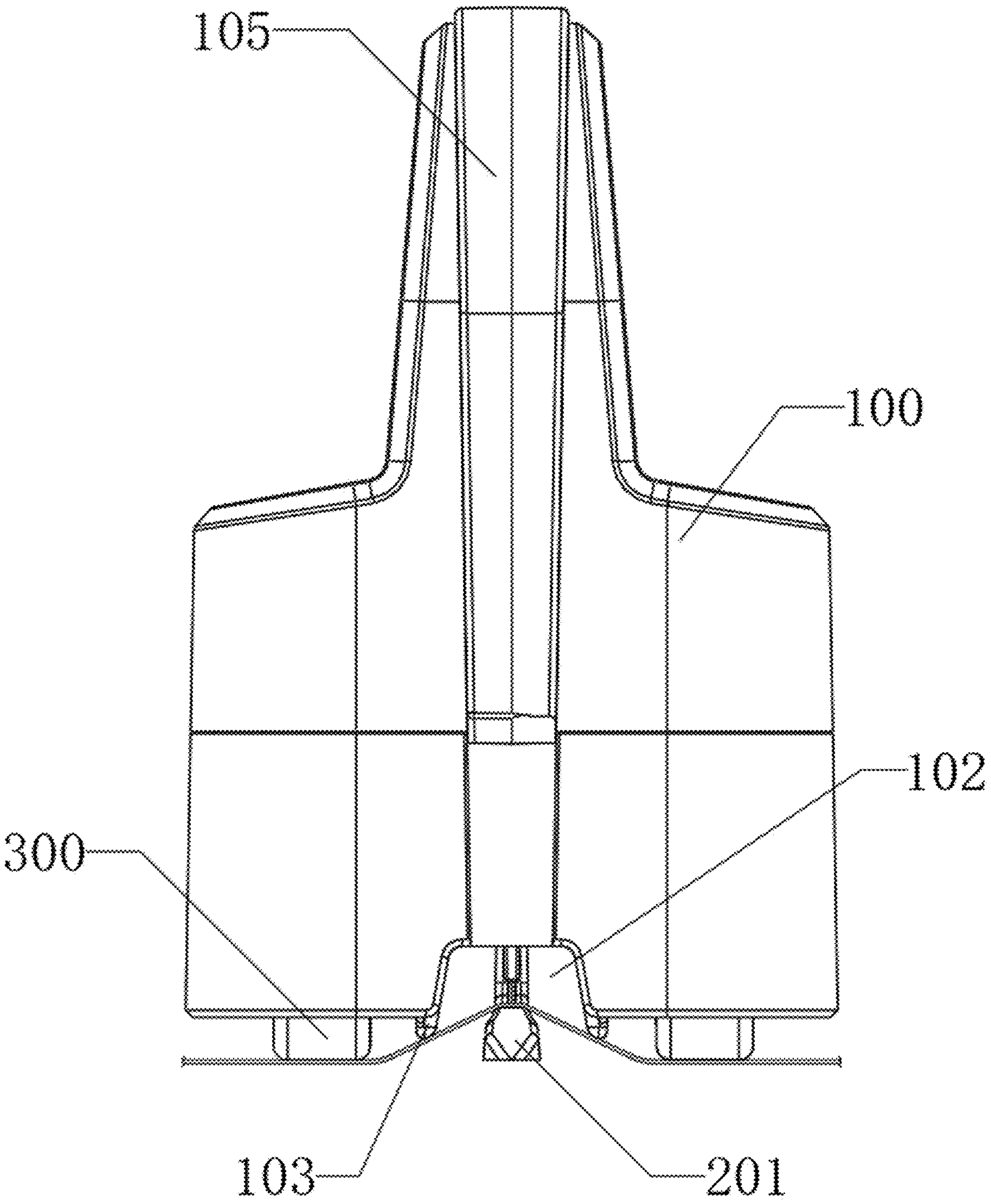
FIG. 4 is a structural diagram of FIG. 1 from another angle.
Figure 5:
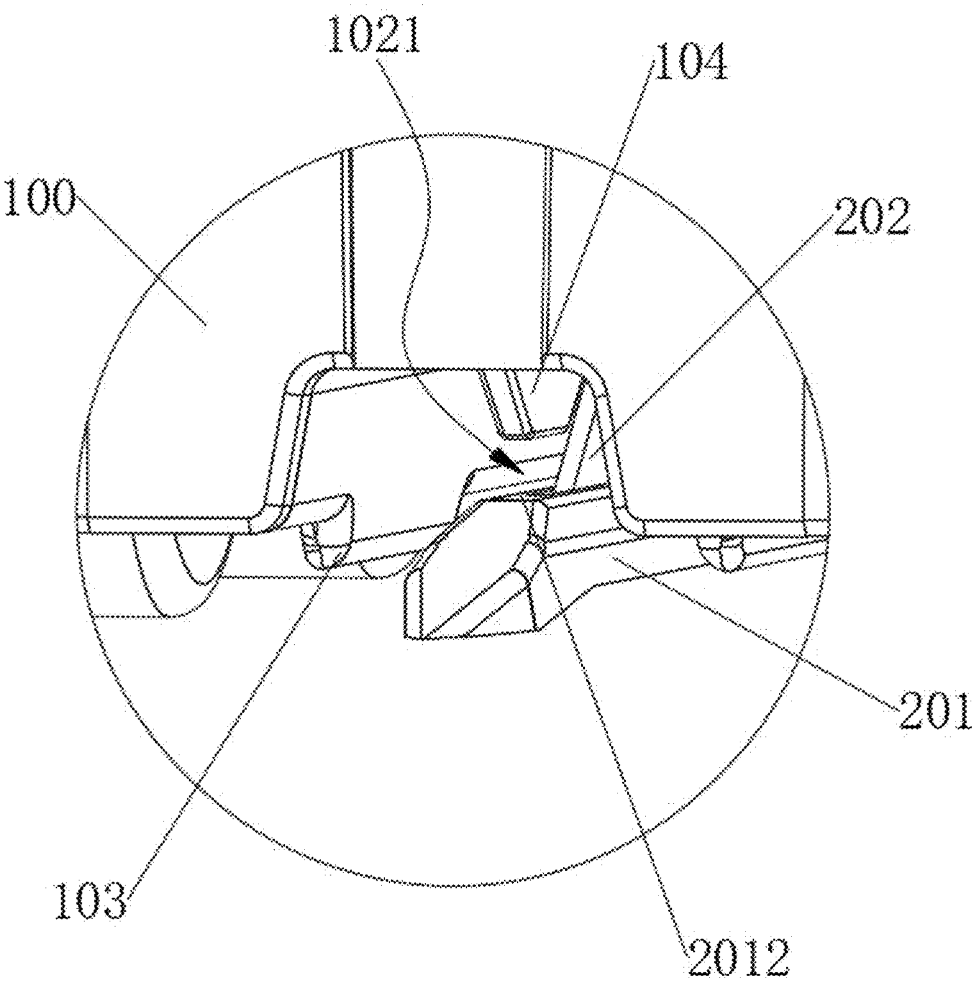
FIG. 5 is a partially enlarged view of part A in FIG. 4.

In one embodiment of the invention, as shown in FIG. 3, the blade holder 201 is provided with a pointed tip 2014 located at the feeding end 1022. The walking mechanism 300 consists of rollers, and the at least four rollers are evenly distributed on two sides of the paper movement direction.

In this embodiment, the pointed tip 2014 transitions smoothly into the supporting face 2012, allowing the pointed tip 2014 to penetrate the bottom of the paper during cutting and guide the paper to slide onto the supporting face 2012.

As shown in FIGS. 2 and 6, in this embodiment, the bottom of the main body 100 is provided with four rollers which are positioned at four corners of the bottom of the main body 100. This arrangement allows the four rollers to work together, ensuring that the main body 100 moves in a straight line. This guarantees that the paper can be cut straight during the cutting process. Of course, the number of rollers is not limited to four; it may also be six, eight, or any even number, with the even number of rollers divided into two groups placed on either side of the receiving groove 102. By increasing the number of rollers, the stability of the main body 100 during linear movement can be improved.

In other embodiments of the walking mechanism 300 (not shown in the figures), the walking mechanism 300 may also be configured as tracks, with at least two tracks positioned on either side of the paper movement direction. By using tracks for movement, the contact area between the walking mechanism 300 and the plane is increased, enhancing the stability of the main body 100 during linear movement and making it less likely to tilt.

In one embodiment of the invention, the main body 100 is provided with a grip 105, and the grip 105 is located on an end face parallel to the cutting face 101. When using the paper cutting apparatus, the grip 105 can be grasped by hand to push the main body 100 across the plane.

Further, the grip 105 is located between two parts of the walking mechanism 300 on two sides. By positioning the grip 105 between two parts of the walking mechanism 300, the force applied when pushing the main body 100 for movement can be evenly distributed across the walking mechanism 300 on two sides, thereby avoiding uneven stress that could cause deviation of the main body 100.

In one embodiment of the invention, as shown in FIGS. 3 and 7, the blade holder 201 is provided with a connecting end 2013 away from the cutting area 1021. The receiving groove 102 features a connecting hole corresponding to the connecting end 2013, and the connecting end 2013 is inserted into the connecting hole. A bolt is inserted through the connecting end 2013 and the connecting hole, establishing a detachable connection. The blade holder 201 is provided with an installation groove 2011, and the blade 202 is embedded into the installation groove 2011 and extends out toward the feeding end 1022.

In this embodiment, the main body 100 is divided into two vertically interlocked parts, with the connecting end 2013 of the blade holder 201 inserted into the lower part of the main body 100 and further reinforced with bolts. When it is necessary to disassemble the blade assembly 200, one only needs to separate the upper and lower parts of the main body 100 and then unscrew the bolts to remove the blade assembly 200 from the main body 100, facilitating the replacement of the blade assembly 200. If the blade 202 needs to be replaced, it can simply be pulled out from the installation groove 2011 and replaced.

Of course, the detachable connection method between the blade assembly 200 and the main body 100 is not limited to the aforementioned approach; in other embodiments (not shown in the figures), it may also be snap-fit connection, screw connection, and other detachable connection methods.

Additionally, in other embodiments (not shown in the figures), the blade assembly 200 and the main body 100 may be connected using a completely fixed method, such as integrally molded connection, fusion bonding, welding, and other fixed connection methods.

Further, in other embodiments (not shown in the figures), the blade assembly 200 and the main body 100 may be connected using a rotational connection method. For example, a pivot shaft is arranged between the connecting end 2013 and the main body 100, allowing the blade assembly 200 to rotate and engage within the receiving groove 102 during use. When it is necessary to replace the blade 202, the blade assembly 200 can be flipped out of the receiving groove 102 for replacement of the blade 202.

In summary, from the above description, it can be seen that the invention achieves the following technical effects:

- the main body 100 is shaped like a rectangular or cubic body, which helps to reduce the volume of the paper cutting apparatus, making it easier to carry and also lowering manufacturing costs;
- the paper pressing sections 103 and the supporting face 2012 work together to allow the paper to arch upward and become tensioned as it passes through the cutting area, which enhances the cutting effect and results in smoother cutting;
- the guiding section 104 is arranged parallel to the supporting face 2012 in the vertical direction, so during paper cutting, the supporting face 2012 and the guiding section 104 work together to impose vertical constraints on the paper, reducing the vertical movement of the paper and further enhancing the cutting effect;
- by providing the receiving groove 102 in the cutting face 101, the blade assembly 200 can be accommodated, preventing contact between the blade 202 and the human body and potential cuts, while also protecting the blade 202 from damage; and
- the arrangement of the walking mechanism 300 ensures that the main body 100 moves in a straight line, so that the paper can be cut straight during the cutting process, thus improving the cutting effect.

In the description of the invention, it should be understood that the orientation or positional relationship indicated by directional words such as "front, back, upper, lower, left, right", "lateral, upright, vertical, horizontal" and "top, bottom" are usually based on the orientation or positional relationship shown in the attached drawings, just for the convenience of describing the invention and simplifying the description. Unless otherwise stated, these directional words do not indicate or imply that the device or element referred to must have a specific orientation or be constructed and operated in a specific orientation, so they cannot be understood as limiting the scope of protection of the invention. The directional words "inside, outside" refer to the inside and outside relative to the outline of each component itself.

For the convenience of description, spatially relative terms such as "on", "over", "on the upper surface of" and "above" can be used here to describe the spatial positional relationship between a device or feature as shown in the figure and other devices or features. It should be understood that spatially relative terms are intended to encompass different orientations in use or operation in addition to the orientation of the device depicted in the drawings. For example, if the devices in the drawings are inverted, devices described as "over" or "on" other devices or structures will be positioned as "under" or "below" other devices or structures. Thus, the exemplary term "over" can include both orientations of "over" and "under". The device can also be positioned in other different ways (rotated by 90 degrees or in other orientations), and the spatial relative description used here is explained accordingly.

In addition, it should be noted that the words "first" and "second" are used to define parts only for the convenience of distinguishing the corresponding parts. Unless otherwise stated, the above words have no special meaning, so they cannot be understood as limiting the protection scope of the invention.

The above embodiments are only preferred ones of the invention, and are not used to limit the invention. For those skilled in the art, the invention may have various modifications and changes. Any modification, equivalent substitution, improvement, etc. made within the spirit and principle of the invention should be included in the protection scope of the invention.

What is claimed is:

1. A hand-pushed paper cutting apparatus, comprising a main body and a blade assembly installed on the main body, wherein the main body has at least one end face oriented toward paper, the at least one end face is configured as a cutting face, and the cutting face is provided with a receiving groove for installing the blade assembly; and the blade assembly comprises a blade holder and a blade, and a gap exists between the blade holder and an inner wall of the receiving groove and is designated as a cutting area;

the cutting area features a feeding end and a cutting end, and a paper movement direction is formed between the feeding end and the cutting end; and the cutting face is provided with paper pressing sections for tensioning the paper, and the paper pressing sections are located on two sides of the paper movement direction; and the blade holder has at least one supporting face facing the cutting area, and the at least one supporting face, in conjunction with the paper pressing sections, tensions the paper; and the cutting area is further provided with a guiding section extending toward the at least one supporting face to direct the paper toward the blade; and the cutting face is also provided with a walking mechanism designed to maintain linear movement of the main body and located on the two sides of the paper movement direction.

2. The hand-pushed paper cutting apparatus according to claim 1, wherein the blade holder is arranged parallel to a length direction of the receiving groove, and extends out of the receiving groove in a height direction of the receiving groove.

3. The hand-pushed paper cutting apparatus according to claim 2, wherein the blade is located at the cutting end.

4. The hand-pushed paper cutting apparatus according to claim 3, wherein the blade holder is provided with an installation groove, and the blade is embedded in the installation groove and extends out toward the feeding end.

5. The hand-pushed paper cutting apparatus according to claim 1, wherein the guiding section is arranged at a bottom of the receiving groove and located between the feeding end and the cutting end.

6. The hand-pushed paper cutting apparatus according to claim 1, wherein the at least one supporting face and the paper pressing sections are both located between the feeding end and the cutting end.

7. The hand-pushed paper cutting apparatus according to claim 6, wherein the at least one supporting face is located in the receiving groove, and the paper pressing sections on each of the two sides of the paper movement direction extend away from the cutting face.

8. The hand-pushed paper cutting apparatus according to claim 1, wherein the blade holder is provided with a pointed tip located at the feeding end.

9. The hand-pushed paper cutting apparatus according to claim 1, wherein the walking mechanism consists of rollers, and the rollers are divided into two groups located on either side of the paper movement direction.

10. The hand-pushed paper cutting apparatus according to claim 1, wherein the main body is provided with a grip, and the grip is arranged on an opposite side of the main body relative to the cutting face.

11. The hand-pushed paper cutting apparatus according to claim 10, wherein the walking mechanism comprises two parts, wherein the two parts comprise a first part on one of the two sides of the paper movement direction and a second part on another of the two sides, and wherein the grip is located between the two parts of the walking mechanism.

12. The hand-pushed paper cutting apparatus according to claim 1, wherein the blade holder is provided with a connecting end away from the cutting area, the receiving groove features a connecting hole corresponding to the connecting end, and the connecting end is inserted into the connecting hole.

13. The hand-pushed paper cutting apparatus according to claim 12, wherein a bolt is inserted through the connecting end and the connecting hole, establishing a detachable connection.

14. A hand-pushed paper cutting apparatus, comprising a main body and a blade assembly installed on the main body, wherein the main body has at least one end oriented toward paper, the at least one end is configured as a cutting terminal, and the blade assembly is arranged on the cutting terminal; and the blade assembly comprises a blade holder and a blade, and a gap exists between the blade holder and the cutting terminal and is designated as a cutting area; and the cutting area features a feeding end and a cutting end, and a paper movement direction is formed between the feeding end and the cutting end; and the cutting terminal is provided with paper pressing sections for tensioning the paper, and the paper pressing sections are located on two sides of the paper movement direction;

the blade holder has at least one supporting face facing the cutting area, and the at least one supporting face, in conjunction with the paper pressing sections, tensions the paper; and the cutting area is further provided with a guiding section extending toward the at least one supporting face to direct the paper toward the blade; and the cutting terminal is also provided with a walking mechanism designed to maintain linear movement of the main body and located on the two sides of the paper movement direction.

15. The hand-pushed paper cutting apparatus according to claim 14, wherein the blade is installed at the cutting end, and the guiding section is arranged on the cutting terminal and located between the feeding end and the cutting end.

16. The hand-pushed paper cutting apparatus according to claim 15, wherein two ends of the guiding section, facing the feeding end and the cutting end, are inclined surfaces.

17. The hand-pushed paper cutting apparatus according to claim 14, wherein the blade holder is provided with a connecting end away from the cutting area, and the connecting end is detachably connected with the cutting terminal.

18. The hand-pushed paper cutting apparatus according to claim 14, wherein the walking mechanism comprises two parts, wherein the two parts comprise a first part on one of the two sides of the paper movement direction and a second part on the other of the two sides of the paper movement direction, and wherein the paper pressing sections are located between the two parts of the walking mechanism.

* * * * *